United States Patent
Chang et al.

(10) Patent No.: US 7,154,514 B2
(45) Date of Patent: Dec. 26, 2006

(54) SYSTEMS AND METHODS FOR DOWNSCALING AN IMAGE

(75) Inventors: Ching-Wei Chang, Vancouver, WA (US); Jiaping Song, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 289 days.

(21) Appl. No.: 10/252,601

(22) Filed: Sep. 23, 2002

(65) Prior Publication Data

US 2004/0056873 A1  Mar. 25, 2004

(51) Int. Cl.
*G09G 5/00* (2006.01)

(52) U.S. Cl. ..................................... 345/667

(58) Field of Classification Search ............... 345/660, 345/666, 667, 668, 669, 670
See application file for complete search history.

(56) References Cited

U.S. PATENT DOCUMENTS

| | | | | |
|---|---|---|---|---|
| 5,299,028 A * | 3/1994 | Kwarta | ...................... | 358/445 |
| 5,608,538 A | 3/1997 | Edgar et al. | ................. | 358/406 |
| 5,627,953 A | 5/1997 | Yen | ............................ | 395/139 |
| H1684 H | 10/1997 | de Queroz et al. | ......... | 382/233 |
| 5,706,451 A * | 1/1998 | Lightbody et al. | .......... | 345/723 |
| 5,867,612 A | 2/1999 | Robson | ...................... | 382/298 |
| 6,058,222 A | 5/2000 | Hashimoto | ................... | 382/300 |
| 6,226,420 B1 | 5/2001 | Hamill | ....................... | 382/299 |
| 6,229,521 B1 * | 5/2001 | Yip | ............................ | 345/611 |
| 6,331,902 B1 | 12/2001 | Lin | ............................ | 358/1.9 |
| 2002/0072047 A1 * | 6/2002 | Michelson et al. | ..... | 434/307 A |

* cited by examiner

*Primary Examiner*—Kee M. Tung
*Assistant Examiner*—Aaron M Richer
(74) *Attorney, Agent, or Firm*—Kirton & McConkie; Michael F. Krieger

(57) ABSTRACT

Systems and methods for downscaling an image. An original image, represented by a collection of individual pixels, is provided so as to be downscaled. One or more of the scan lines of the original image are selectively skipped. One or more of the pixels of non-skipped scan lines are selectively skipped. The remaining pixels are then used to provide the pixels of the downscaled image. In a further implementation, the remaining pixels are used by selectively being averaged to downscale the image. Accordingly, a reduced number of pixels are averaged in order to create a new pixel of the downscaled image. Implementation of the present invention may also avoid a division process by using a right shift instead of division in the averaging process. Accordingly, implementation of the present invention reduces the time required to downscale an image and is also device independent.

6 Claims, 6 Drawing Sheets

SYSTEMS AND METHODS FOR DOWNSCALING AN IMAGE

BACKGROUND OF THE INVENTION

1. Field of the Invention

The present invention relates systems and methods for downscaling an image. In particular, the present invention relates to skipping one or more scan lines of an original image, skipping one or more additional pixels of the original image, and using the remaining pixels of the original image to efficiently downscale the original image.

2. Background and Related Art

The emergence of the personal computer and associated computer applications has allowed text and/or graphics to be displayed or printed in a variety of different ways. One such way of displaying or printing text and/or graphics includes the use of a "thumbnail," which is a miniature representation of a page or image. A particular thumbnail may be displayed to provide a preview of an entire page. Thumbnails enable a user to view the layout of many pages at once on a screen. For example, a plurality of thumbnails may be displayed on a computer screen at the same time to provide a quick preview of a computer presentation that has been created. Thumbnails also provide a convenient way to browse through multiple images, and are typically associated with programs that allow a user to click on the thumbnail in order to retrieve the full image.

A thumbnail may be created through the use of a program that is a stand-alone application or is part of a desktop publishing or graphics program. When thumbnails are too small to show actual text, a process referred to as "greeking" may be used to approximate the text characters in order to indicate how the page will appear.

While the use of a thumbnail as a miniature representation of a page or image can prove to be advantageous to a user, the technique requires considerable time to generate the thumbnail because of the large ratio of downscaling that is required. For example, when the process referred to as "local averaging" is used to scale down the size of an original image to one-third on each dimension, each three by three area of the image is averaged in order to obtain corresponding pixel values for the thumbnail image. This process has proven to be slow, especially when a large number of images are reduced. For example, if a user desires to print a letter-sized (8½"×11") page containing 80 images of the original size 2048×1536 pixels, it can take over a minute and ten seconds just to perform the scaling.

Thus, while techniques are available for use in creating a thumbnail image, challenges still exist such as requiring considerable time to generate the thumbnail due to the large ratio of downscaling that is required. Accordingly, it would be an improvement in the art to augment or even replace current techniques with other techniques.

SUMMARY OF THE INVENTION

The present invention relates systems and methods for downscaling an image. In particular, the present invention relates to skipping one or more scan lines of an original image, skipping one or more additional pixels of the original image, and using the remaining pixels of the original image to efficiently downscale the original image.

Implementation of the present invention takes place in association with an original image that is to be downscaled, wherein the original image is represented by a collection of individual pixels. One or more of the scan lines of the original image are skipped. One or more of the pixels of non-skipped scan lines are skipped. The remaining pixels are then used to downscale the image.

In a further implementation, the remaining pixels are selectively averaged to downscale the image. Accordingly, a reduced number of pixels are averaged in order to create a new pixel of the downscaled image. Implementation of the present invention may also avoid division in the averaging process by using a right shift instead of the division.

Implementation of the present invention reduces the time required to downscale an image. Accordingly, this reduction in time reduces the time a user is required to wait for an image to print. Further, implementation of the present invention is device independent. For example, the downscaling may be implemented in a printer driver or a printer controller. Accordingly, the downscaling is applicable to a variety of different kinds of printers, such as inkjet printers, laser printers, and multi-function printers ("MFP").

While the methods and processes of the present invention have proven to be particularly useful in the area of printing a downscaling image, those skilled in the art will appreciate that the methods and processes can be used in a variety of different applications to yield a downscaled image, including displaying a downscaled image on a display device.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates systems and methods for downscaling an image. In particular, the present invention relates to skipping one or more scan lines of an original image, skipping one or more additional pixels of the original image, and using the remaining pixels of the original image to efficiently downscale the original image.

Embodiments of the present invention embrace an original image that is to be downscaled, wherein the original image may be represented by a collection of individual pixels. In accordance with embodiments of the present invention, one or more of the scan lines of the original image are skipped and one or more of the pixels of the non-skipped scan line are skipped. The remaining pixels are then used to downscale the image.

In further embodiments, the remaining pixels are used to selectively average the remaining pixels to downscale the image. Accordingly, a reduced number of pixels may be averaged in creating a corresponding new pixel of the downscaled image. In further embodiments, a process of division is avoided in the averaging process by using a right shift instead of the division process. Embodiments of the present invention are device independent to allow for the downscaling of an image in a variety of different types of systems and/or environments.

The following disclosure of the present invention is grouped into two subheadings, namely "Exemplary Operating Environment" and "Downscaling an Image." The utilization of the subheadings is for convenience of the reader only and is not to be construed as limiting in any sense.

Exemplary Operating Environment

Figure 1:
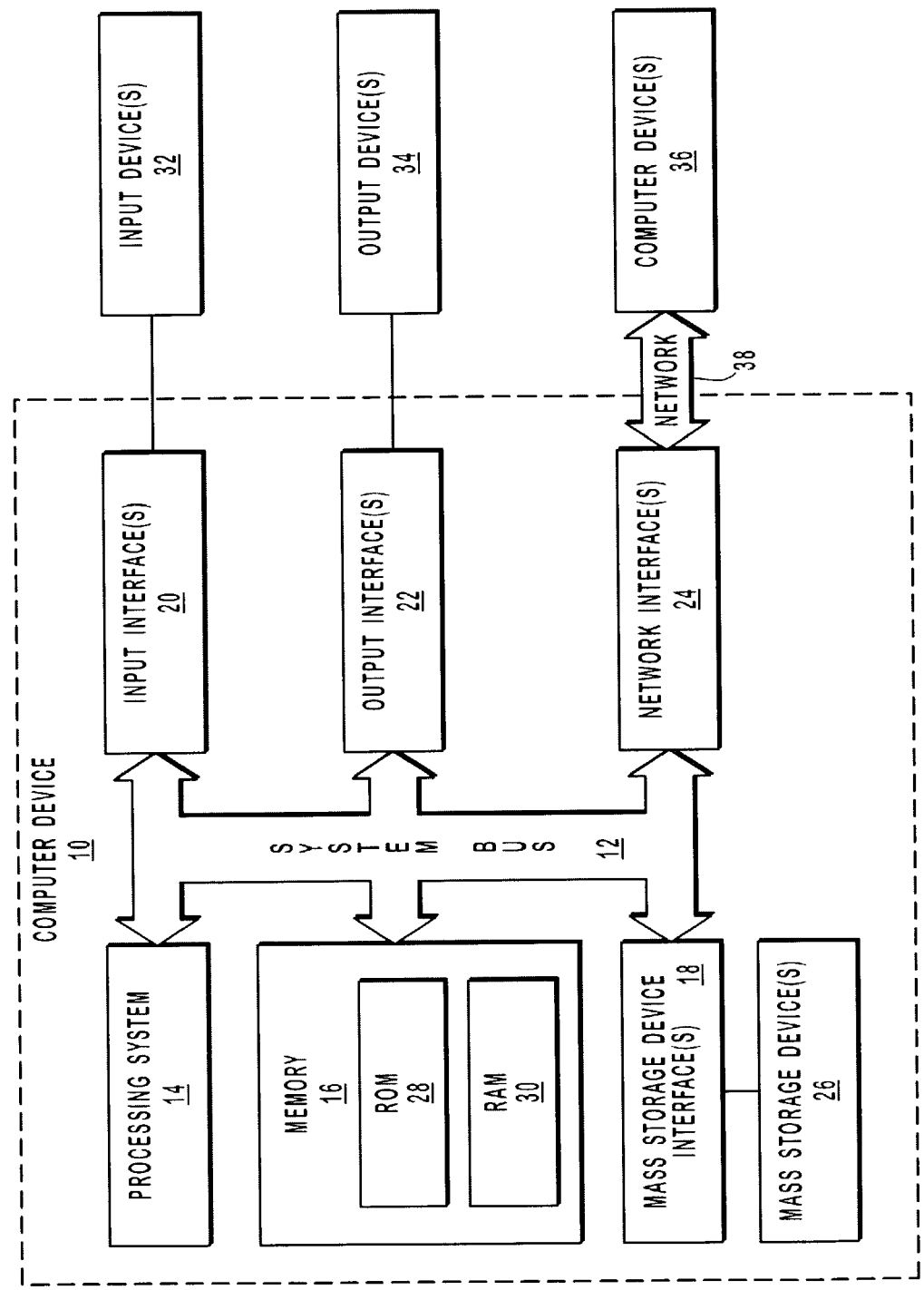
FIG. 1 illustrates a representative system that provides a suitable operating environment for use of the present invention.

FIG. 1 and the corresponding discussion are intended to provide a general description of a suitable operating environment in which the invention may be implemented. One skilled in the art will appreciate that the processing disclosed herein may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a printer, a scanner, a facsimile machine, a photocopy machine, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
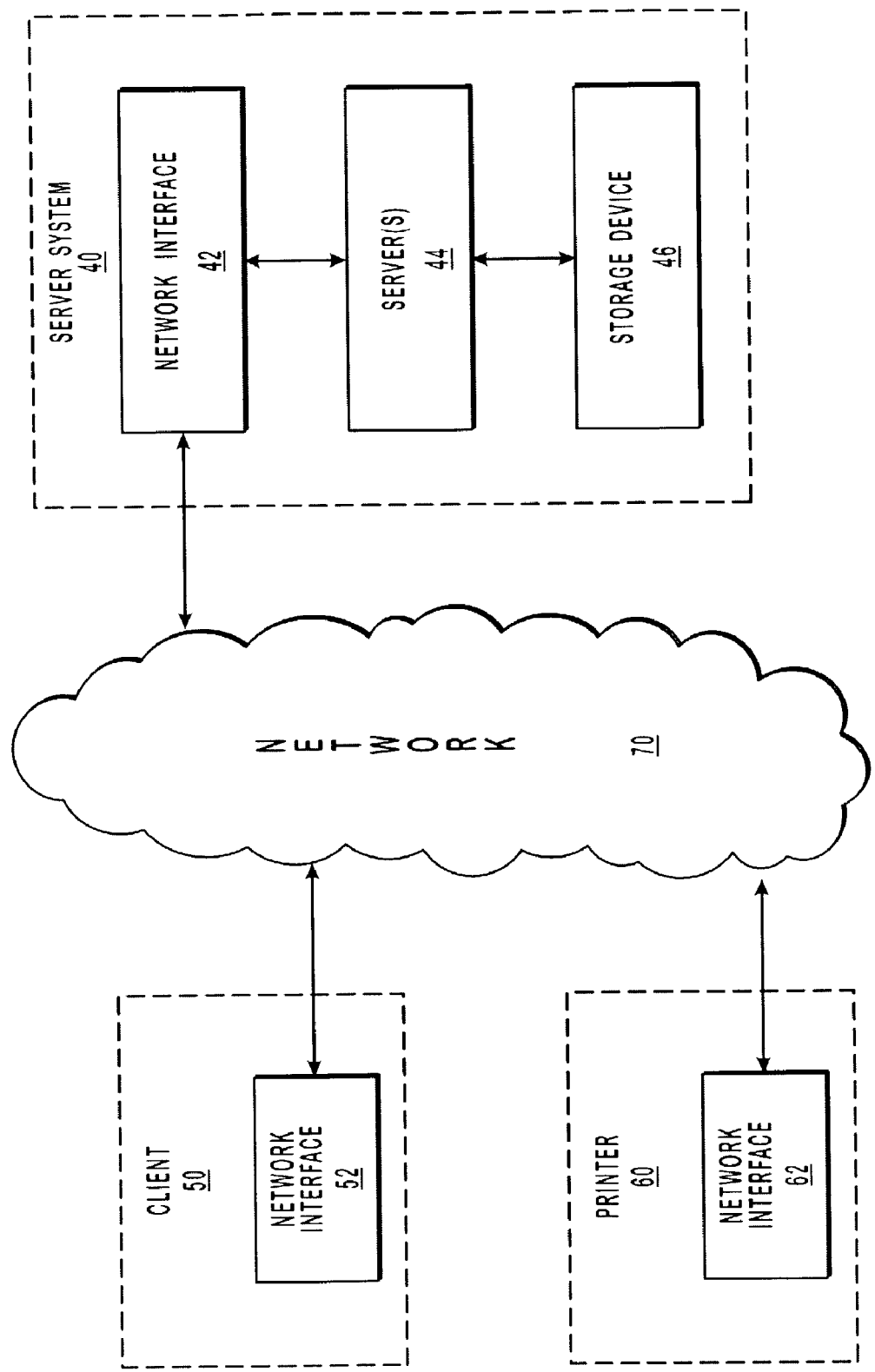
FIG. 2 illustrates a representative networked system for use of an embodiment of the present invention.

While those skilled in the art will appreciate that the invention may be practiced in networked computing environments with many types of computer system configurations, FIG. 2 represents an embodiment of the present invention in a networked environment that includes a client connected to a server via a network. While FIG. 2 illustrates an embodiment that includes one client computer device and one printer connected to the network, alternative embodiments include more than one client and/or other devices connected to a network.

In FIG. 2, a representative networked configuration is provided for which downscaling of an image may occur. Server system 40 represents a system configuration that includes one or more servers that selectively manage or process data located in one or more databases preserved in one or more storage devices. Accordingly, server system 40 includes a network interface 42, one or more servers 44, and a storage device 46. One or more clients, such as client 50, communicate with server system 40 via network 70, which may include a wireless network, a local area network, and/or a wide area network. Network interface 42 is a communication mechanism that allows server system 40 to communicate with the one or more clients via network 70.

In the illustrated embodiment, the networked system includes client 50 and printer 60. Each includes a network interface, respectively illustrated as network interfaces 52 and 62, to enable an exchange of information over network 70. Accordingly, in accordance with embodiments of the present invention, an original image may be selectively downscaled and displayed at client 50 and/or at printer 60. Moreover, an original image may be selectively downscaled and printed at printer 60.

While the illustrated embodiment of FIG. 2 provides a networked system configuration, those skilled in the art will appreciate that the methods and processes of the present invention may be performed in a variety of system configurations, including within a system configuration that includes a computer device directly coupled to a printer, within a computer device, within a printer, within a facsimile machine, within a scanner, within a photocopy machine, etc.

Downscaling an Image

As provided above, embodiments of the present invention relate systems and methods for downscaling an image. In particular, embodiments of the present invention may relate to using a computer device to selectively skip one or more scan lines of an original image, skip one or more additional pixels of the original image, and use the remaining pixels of the original image to efficiently downscale the original image. The following provides specific details as to downscaling an image in accordance with embodiments of the present invention.

In accordance with embodiments of the present invention, a specific process cycle pattern is designed for a particular fixed scaling ratio. In each cycle one or more pixels and scan lines are skipped from averaging. Three considerations for each process cycle pattern include: 1) distributing the selection of skipped pixels and scan lines as evenly as possible; 2) matching the output with the scaling ratio; and 3) optionally using a right shift rather than a process of division in performing a process of averaging.

Figure 3:
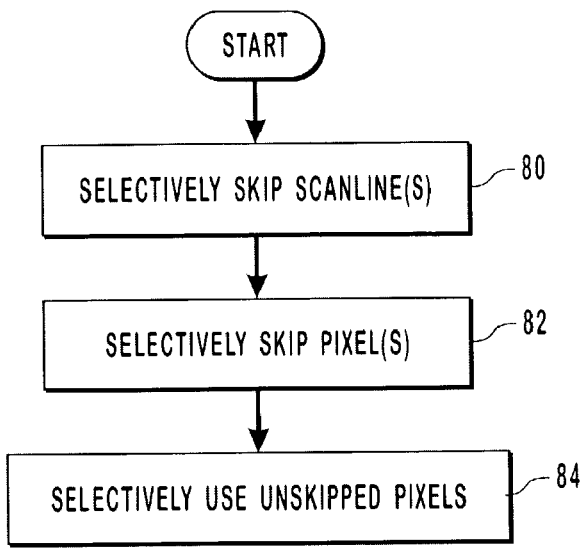
FIG. 3 illustrates a flow chart that provides an embodiment for downscaling an image in accordance with the present invention.

With reference now to FIG. 3, a flow chart is illustrated that provides a representative embodiment for downscaling an image in accordance with the present invention. In FIG. 3, execution begins at step 80 where one or more scan lines of at least a portion of an image are skipped. At step 82 one or more pixels of non-skipped scan lines are skipped. At step 84 the remaining un-skipped pixels are used in creating pixels for the downscaled image. For example, in some embodiments the remaining un-skipped pixels are used by averaging two or more of the un-skipped pixels, as will be illustrated below.

The following provides various examples for downscaling an original image in accordance with embodiments of the present invention. In particular, the following examples relate to seven downscaling ratios, namely ½ (50%), ⅖ (40%), ⅓ (33.3%), 14/(25%), ⅕ (20%), ⅙ (16.7%), and ⅛ (12.5%) the size of the original image.

In regard to scaling an image to fifty percent of the original size, every other scan line (a horizontal line in a graphics frame) and every other pixel are skipped. The remaining un-skipped pixels are then used in the scaling process to create a corresponding pixel combination for the downscaled image, which may be selectively displayed and/or printed. Experiments have indicated that this technique produces a similar quality of the image as using traditional techniques and reduces the time required to downscale an image, as will be further discussed below.

Figure 4A:
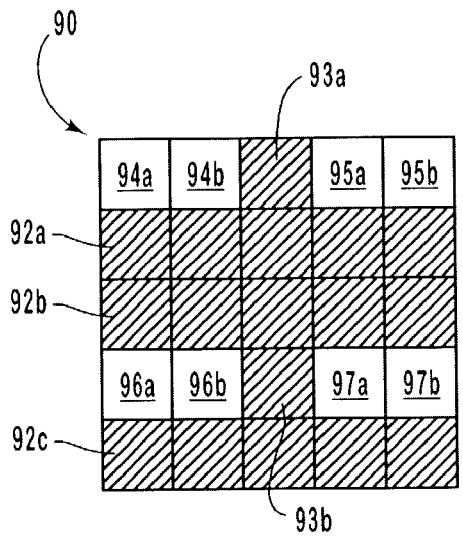
FIG. 4A illustrates a representative method for downscaling an image to 40% of the original size.

With reference to FIG. 4A, a representative embodiment is illustrated for downscaling an image to forty percent of the original size. In FIG. 4A, a pixel area 90 is illustrated of an original image that is five-pixels by five-pixels. The number of pixels along each side of pixel area 90 corresponds to the denominator or a multiple of the denominator of the fraction for which the image is to be downscaled. Area 90 may be only a portion of the original image and accordingly the methods and processes disclosed herein are performed for all pixel areas of the original image, including pixel area 90, in order to downscale an image to forty percent of the original size.

In pixel area 90, scan lines 92 are skipped and pixels 93 are skipped in the downscaling process. The non-skipped pixels 94–97 are then used to create the downscaled image. In particular, pixels 94 are averaged together, pixels 95 are averaged together, pixels 96 are averaged together, and pixels 97 are averaged together to create corresponding pixels for the downscaled image. In a further embodiment, the averaging process of the pixels includes a right shift rather than a process of division to further increase the speed of downscaling the image. The downscaled image may then be selectively displayed and/or printed.

Figure 4B:
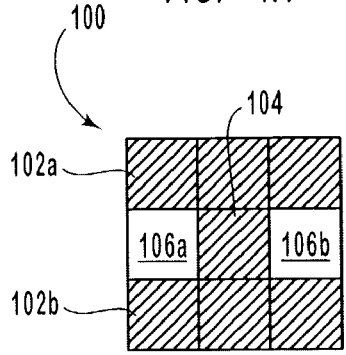
FIG. 4B illustrates a representative method for downscaling an image to one-third of the original size.

With reference now to FIG. 4B, a representative embodiment is illustrated for downscaling an image to one-third the original size. In FIG. 4B, a pixel area 100 is illustrated of an original image that is three-pixels by three-pixels. The number of pixels along each side of pixel area 100 corresponds to the denominator or a multiple of the denominator of the fraction for which the image is to be downscaled. Area 100 may be only a portion of the original image and accordingly the methods and processes disclosed herein are performed for all pixel areas of the original image, including pixel area 100, in order to downscale an image to one-third the original size.

In pixel area 100, scan lines 102 and pixel 104 are skipped in the downscaling process. The non-skipped pixels 106 are then used to create the downscaled image. In particular, pixels 106 are averaged together to create to create corresponding pixels for the downscaled image. As provided above, in a further embodiment, the averaging process of the pixels includes a right shift rather than a process of division to further increase the speed of downscaling the image. The downscaled image may then be selectively displayed and/or printed.

Figure 4C:
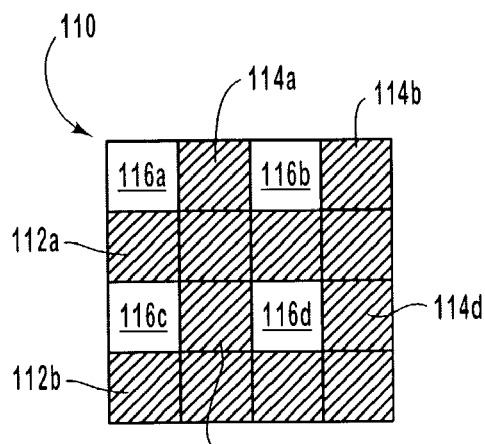
FIG. 4C illustrates a representative method for downscaling an image to 25% of the original size.

With reference now to FIG. 4C, a representative embodiment is illustrated for downscaling an image to one-fourth the original size. In FIG. 4C, a pixel area 110 is illustrated of an original image that is four-pixels by four-pixels. The number of pixels along each side of pixel area 110 corresponds to the denominator or a multiple of the denominator of the fraction for which the image is to be downscaled. Area 110 may be only a portion of the original image and accordingly the methods and processes disclosed herein are performed for all pixel areas of the original image, including pixel area 110, in order to downscale an image to one-fourth the original size.

In pixel area 110, scan lines 112 and pixels 114 are skipped in the downscaling process. The non-skipped pixels 116 are then used to create the downscaled image. In particular, pixels 116 are averaged together to create corresponding pixels for the downscaled image. As provided above, in a further embodiment, the averaging process of the pixels includes a right shift rather than a process of division to further increase the speed of downscaling the image. The downscaled image may then be selectively displayed and/or printed.

Figure 4D:
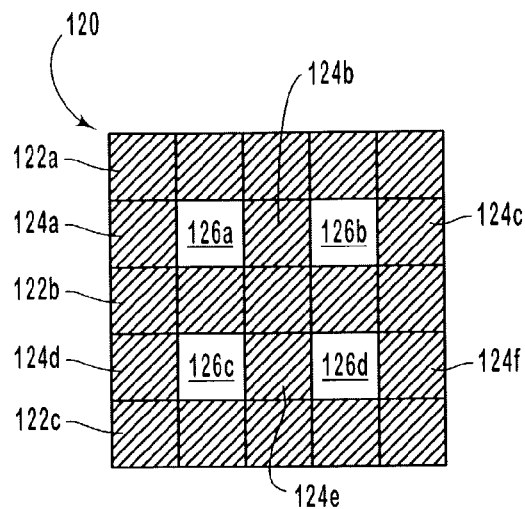
FIG. 4D illustrates a representative method for downscaling an image to 20% of the original size.

With reference now to FIG. 4D, a representative embodiment is illustrated for downscaling an image to one-fifth the original size. In FIG. 4D, a pixel area 120 is illustrated of an original image that is five-pixels by five-pixels. The number of pixels along each side of pixel area 120 corresponds to the denominator or a multiple of the denominator of the fraction for which the image is to be downscaled. Area 120 may be only a portion of the original image and accordingly the methods and processes disclosed herein are performed for all pixel areas of the original image, including pixel area 120, in order to downscale an image to one-fourth the original size.

In pixel area 120, scan lines 122 and pixels 124 are skipped in the downscaling process. The non-skipped pixels 126 are then used to create the downscaled image. In particular, pixels 126 are averaged together to create corresponding pixels for the downscaled image. As provided above, in a further embodiment, the averaging process of the pixels includes a right shift rather than a process of division to further increase the speed of downscaling the image. The downscaled image may then be selectively displayed and/or printed.

Figure 4E:
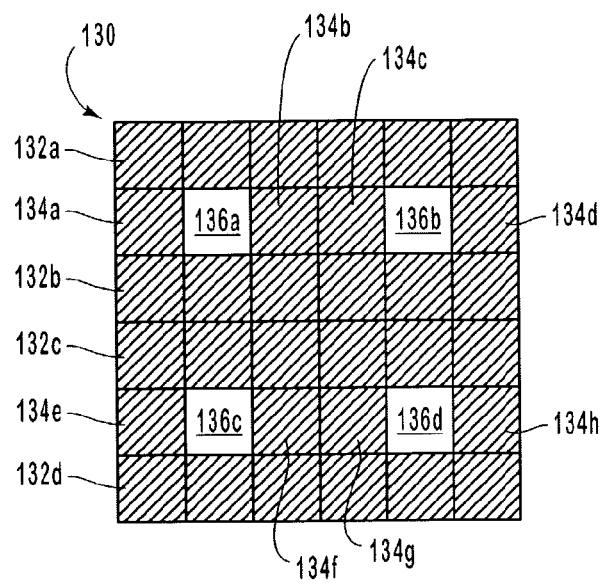
FIG. 4E illustrates a representative method for downscaling an image to one-sixth of the original size.

With reference now to FIG. 4E, a representative embodiment is illustrated for downscaling an image to one-sixth the original size. In FIG. 4E, a pixel area 130 is illustrated of an original image that is six-pixels by six-pixels. The number of pixels along each side of pixel area 130 corresponds to the denominator or a multiple of the denominator of the fraction for which the image is to be downscaled. Area 130 may be only a portion of the original image and accordingly the methods and processes disclosed herein are performed for all pixel areas of the original image, including pixel area 130, in order to downscale an image to one-sixth the original size.

In pixel area 130, scan lines 132 and pixels 134 are skipped in the downscaling process. The non-skipped pixels 136 are then used to create the downscaled image. In particular, pixels 136 are averaged together to create corresponding pixels for the downscaled image. As provided above, in a further embodiment, the averaging process of the pixels includes a right shift rather than a process of division to further increase the speed of downscaling the image. The downscaled image may then be selectively displayed and/or printed.

Figure 4F:
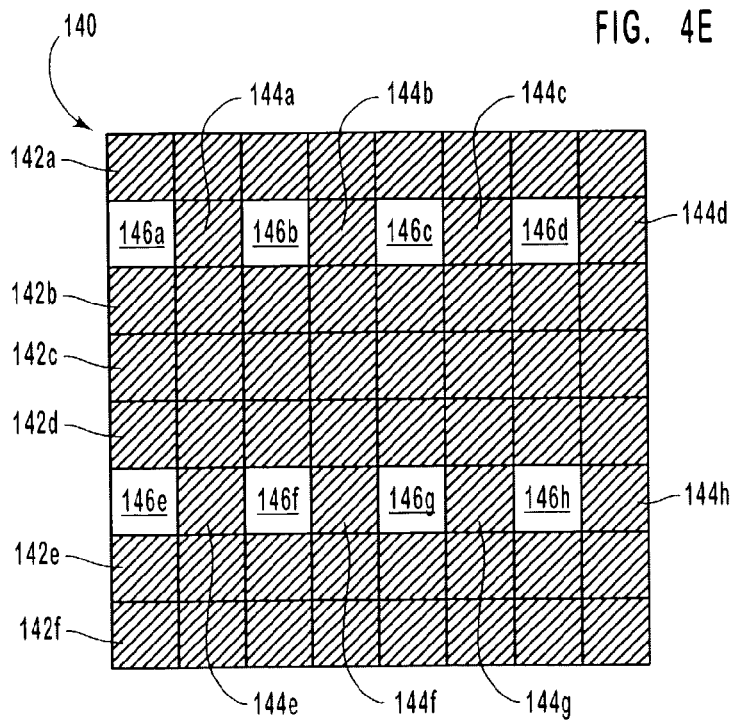
FIG. 4F illustrates a representative method for downscaling an image to one-eighth of the original size.

With reference now to FIG. 4F, a representative embodiment is illustrated for downscaling an image to one-eighth the original size. In FIG. 4F, a pixel area 140 is illustrated of an original image that is eight-pixels by eight-pixels. The number of pixels along each side of pixel area 140 corresponds to the denominator or a multiple of the denominator of the fraction for which the image is to be downscaled. Area 140 may be only a portion of the original image and accordingly the methods and processes disclosed herein are performed for all pixel areas of the original image, including pixel area 140, in order to downscale an image to one-eighth the original size.

In pixel area 140, scan lines 142 and pixels 144 are skipped in the downscaling process. The non-skipped pixels 146 are then used to create the downscaled image. In particular, pixels 146 are averaged together to create corresponding pixels for the downscaled image. As provided above, in a further embodiment, the averaging process of the pixels includes a right shift rather than a process of division to further increase the speed of downscaling the image. The downscaled image may then be selectively displayed and/or printed.

Figure 5:
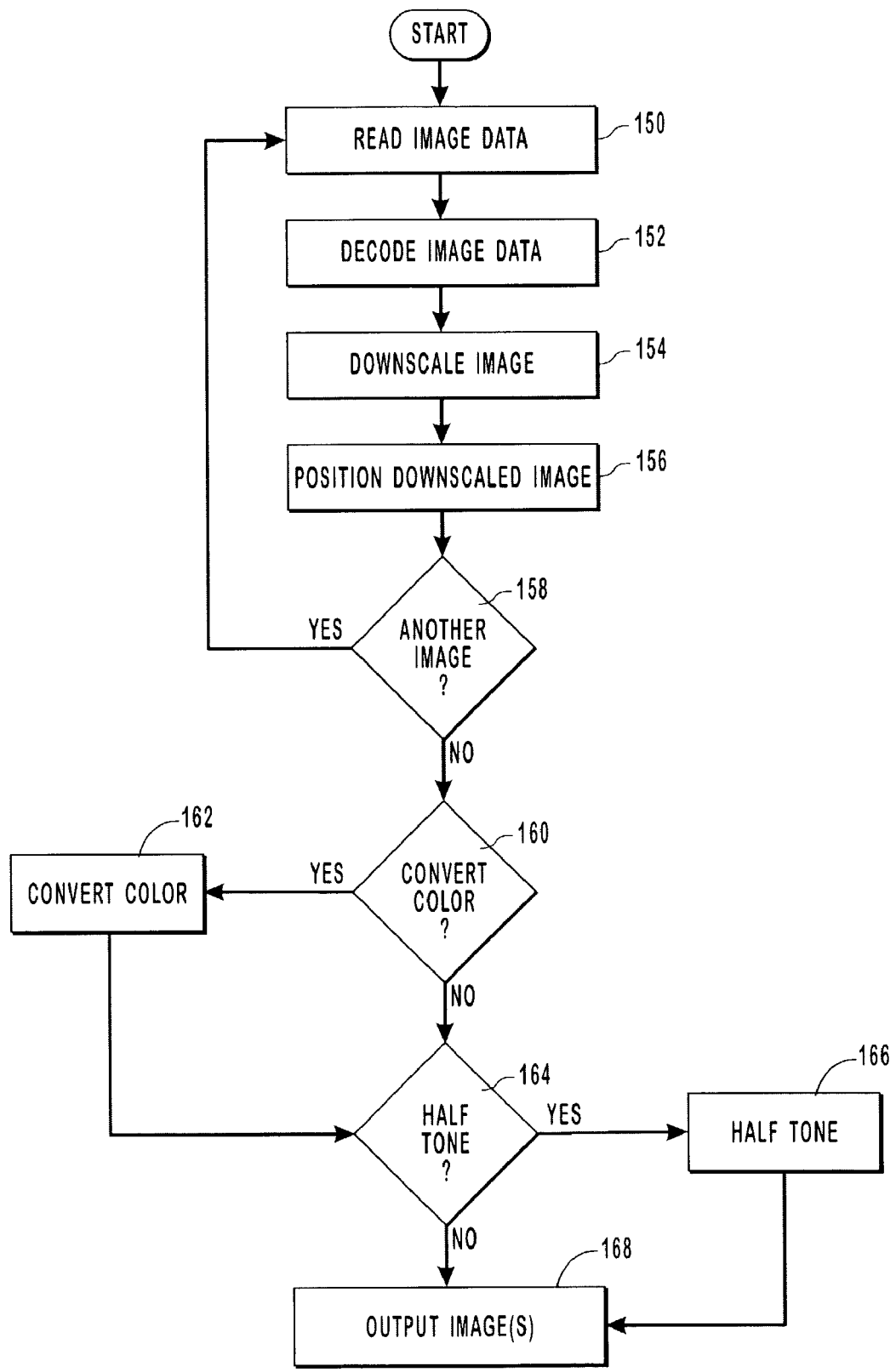
FIG. 5 illustrates a representative method for downscaling and outputting one or more images.

With reference now to FIG. 5, a flowchart is illustrated that provides a representative method for downscaling and outputting (e.g., displaying, printing, etc.) one or more images. In FIG. 5, execution begins at step 150 where image data is read. (For example, once a printer controller receives a thumbnail printing job, the controller begins to read an image.) At step 152, the image data is decoded. (For example, the scaling ratio is identified.) At step 154, the image is selectively downscaled. (For example, the image is downscaled to a fraction of the size of the original image by selectively skipping one or more scan lines, skipping one or more pixels, and selectively using the non-skipped pixels.) At step 156, the downscaled image is selectively positioned. A determination is then made at decision block 158 as to whether or not another image exists that is to be downscaled. If it is determined at decision block 158 that another image exists for downscaling, execution returns back to step 150 and then through steps 152–156 for the subsequent image.

Once it is determined at decision block 158 that another image for downscaling does not exist, execution proceeds to decision block 160 for a determination as to whether or not to convert the color. An example of a color conversion includes converting from RGB to CMYK. If it is determined at decision block 160 that the color is to be converted, execution proceeds to step 162 for the conversion of the color and then to decision block 164. Alternatively, if it is determined at decision block 160 that the color is not to be converted, execution proceeds directly to decision block 164.

At decision block 164 a determination is made as to whether or not to half-tone the downscaled image. If it is determined at decision block 164 that the downscaled image is to be half-toned, execution proceeds to step 166, where the downscaled image is half-toned, and then to step 168. Alternatively, if it is determined at decision block 164 that the downscaled image is not to be half-toned, execution proceeds directly to step 168. At step 168, the one or more downscaled images are output.

Figure 6:
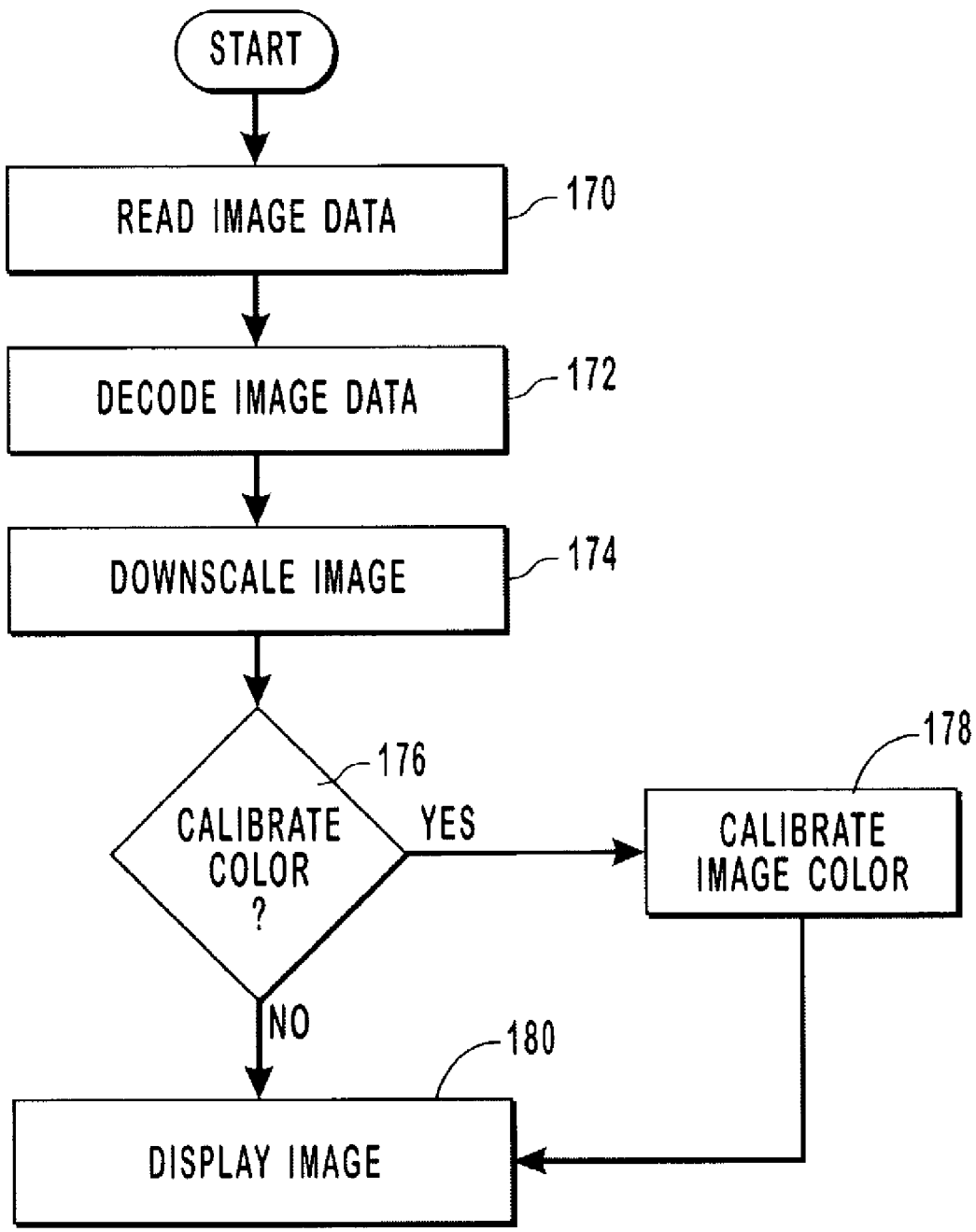
FIG. 6 illustrates another representative method for downscaling and displaying an image.

With reference now to FIG. 6, a flow chart is illustrated that provides another representative method for downscaling and displaying (e.g., displaying, printing, outputting, etc.) an image. In FIG. 6, execution begins at step 170 where image data is read. At step 172 the image data is decoded. At step 174, the image is then downscaled. A determination is then made at decision block 176 as to whether or not to calibrate the color of the image. If it is determined at decision block 176 that the color is to be calibrated, execution proceeds to step 178 for the calibration of the image color and then to step 180. Alternatively, if it is determined at decision block 176 that the color is not to be calibrated, execution proceeds directly to step 180 for the display of the downscaled image.

In a further embodiment, instead of printing out the images, a user is provided a preview of the images on a display and may select one or more of the images for printing.

The scaling of a large number of color images has typically become a bottle-neck for the printing process. The following indicates that embodiments of the present invention improve the scaling speed significantly without compromising the quality. With reference now to Table 1 below, a performance comparison is provided between the embodiments of the present invention and traditional techniques. The time in Table 1 is the total time for scaling four images of size 2048×1536 pixels. For each set of the tests, three iterations were performed on a Linux® platform with a 500 MHz Intel® Celeron processor and the mean value was taken as the benchmark.

TABLE 1

| Scaling Rate | Approximate Time for Methods Discussed Herein (seconds) | Approximate Time for Traditional Techniques (seconds) |
| --- | --- | --- |
| 1/2 | 2 | 5 |
| 2/5 | 2 | 4 |
| 1/3 | 2 | 3 |
| 1/4 | 2 | 4 |
| 1/5 | 3 | 5 |
| 1/6 | 3 | 4 |
| 1/8 | 1 | 2 |

A letter-sized (8½×11) paper is able to hold more than 80 images of size 2048×1536 when the scaling ratio is 1/4. And, the performance time for downscaling the images in accordance with the present invention is 40 seconds as opposed to over 80 seconds required by traditional techniques, which is a significant improvement.

While the examples provided herein have referenced downscaling an image to ½, ⅖, ⅓, ¼, ⅕, ⅙, or ⅛ of the original size of the image, those skilled in the art will appreciate that embodiments of the present invention embrace other fractions/ratios for downscaling, including ⅐, ⅒, and other fractions/ratios.

Thus, as discussed herein, the embodiments of the present invention embrace systems and methods for downscaling an image. In particular, the present invention relates to skipping one or more scan lines of an original image, skipping one or more additional pixels of the original image, and using the remaining pixels of the original image to efficiently downscale the original image.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for downscaling an image, the method comprising the steps for:
   providing an image that is represented by a plurality of pixels, wherein the image is to be downscaled;
   selectively skipping one or more scan lines from the plurality of pixels;
   selectively skipping one or more pixels from non-skipped scan lines from the plurality of pixels; and
   using non-skipped pixels from the non-skipped scan lines to downscale the image;
   wherein the method is used to downscale the image to two-fifths the size of the image and further includes the step for subdividing the plurality of pixels into 5×5 pixel areas, wherein the step for selectively skipping one or more scan lines from the plurality of pixels includes a step for skipping three scan lines of each of the pixel areas, wherein the step for selectively skipping one or more pixels from non-skipped scan lines from the plurality of pixels includes skipping a pixel from each of the non-skipped scan lines of each of the pixel areas, and wherein the step for using non-skipped pixels from the non-skipped scan lines to downscale the image includes the steps for pairing the non-skipped pixels and averaging the paired pixels to downscale the image.

2. A method for downscaling an image, the method comprising the steps for:
providing an image that is represented by a plurality of pixels, wherein the image is to be downscaled;
selectively skipping one or more scan lines from the plurality of pixels;
selectively skipping one or more pixels from non-skipped scan lines from the plurality of pixels; and
using non-skipped pixels from the non-skipped scan lines to downscale the image;
wherein the method is used to downscale the image to one-third the size of the image and further includes the step for subdividing the plurality of pixels into 3×3 pixel areas, wherein the step for selectively skipping one or more scan lines from the plurality of pixels includes a step for skipping two scan lines of each of the pixel areas, wherein the step for selectively skipping one or more pixels from non-skipped scan lines from the plurality of pixels includes skipping a pixel from the non-skipped scan lines of each of the pixel areas, and wherein the step for using non-skipped pixels from the non-skipped scan lines to downscale the image includes the step for averaging the non-skipped pixels of each of the pixel areas to downscale the image.

3. A method for downscaling an image, the method comprising the steps for:
providing an image that is represented by a plurality of pixels, wherein the image is to be downscaled;
selectively skipping one or more scan lines from the plurality of pixels;
selectively skipping one or more pixels from non-skipped scan lines from the plurality of pixels; and
using non-skipped pixels from the non-skipped scan lines to downscale the image
wherein the method is used to downscale the image to one-fourth the size of the image and further includes the step for subdividing the plurality of pixels into 4×4 pixel areas, wherein the step for selectively skipping one or more scan lines from the plurality of pixels includes a step for skipping two scan lines of each of the pixel areas, wherein the step for selectively skipping one or more pixels from non-skipped scan lines from the plurality of pixels includes skipping two pixel from each of the non-skipped scan lines of each of the pixel areas, and wherein the step for using non-skipped pixels from the non-skipped scan lines to downscale the image includes the step for averaging the non-skipped pixels of each of the pixel areas to downscale the image.

4. A method for downscaling an image, the method comprising the steps for:
providing an image that is represented by a plurality of pixels, wherein the image is to be downscaled;
selectively skipping one or more scan lines from the plurality of pixels;
selectively skipping one or more pixels from non-skipped scan lines from the plurality of pixels; and
using non-skipped pixels from the non-skipped scan lines to downscale the image;
wherein the method is used to downscale the image to one-fifth the size of the image and further includes the step for subdividing the plurality of pixels into 5×5 pixel areas, wherein the step for selectively skipping one or more scan lines from the plurality of pixels includes a step for skipping three scan lines of each of the pixel areas, wherein the step for selectively skipping one or more pixels from non-skipped scan lines from the plurality of pixels includes skipping three pixels from each of the non-skipped scan lines of each of the pixel areas, and wherein the step for using non-skipped pixels from the non-skipped scan lines to downscale the image includes the step for averaging the non-skipped pixels of each of the pixel areas to downscale the image.

5. A method for downscaling an image, the method comprising the steps for:
providing an image that is represented by a plurality of pixels, wherein the image is to be downscaled;
selectively skipping one or more scan lines from the plurality of pixels;
selectively skipping one or more pixels from non-skipped scan lines from the plurality of pixels; and
using non-skipped pixels from the non-skipped scan lines to downscale the image;
wherein the method is used to downscale the image to one-sixth the size of the image and further includes the step for subdividing the plurality of pixels into 6×6 pixel areas, wherein the step for selectively skipping one or more scan lines from the plurality of pixels includes a step for skipping four scan lines of each of the pixel areas, wherein the step for selectively skipping one or more pixels from non-skipped scan lines from the plurality of pixels includes skipping four pixels from each of the non-skipped scan lines of each of the pixel areas, and wherein the step for using non-skipped pixels from the non-skipped scan lines to downscale the image includes the step for averaging the non-skipped pixels of each of the pixel areas to downscale the image.

6. A method for downscaling an image, the method comprising the steps for:
providing an image that is represented by a plurality of pixels, wherein the image is to be downscaled;
selectively skipping one or more scan lines from the plurality of pixels;
selectively skipping one or more pixels from non-skipped scan lines from the plurality of pixels; and
using non-skipped pixels from the non-skipped scan lines to downscale the image;
wherein the method is used to downscale the image to one-eighth the size of the image and further includes the step for subdividing the plurality of pixels into 8×8 pixel areas, wherein the step for selectively skipping one or more scan lines from the plurality of pixels includes a step for skipping six scan lines of each of the pixel areas, wherein the step for selectively skipping one or more pixels from non-skipped scan lines from the plurality of pixels includes skipping four pixels from each of the non-skipped scan lines of each of the pixel areas, and wherein the step for using non-skipped pixels from the non-skipped scan lines to downscale the image includes the step for averaging the non-skipped pixels of each of the pixel areas to downscale the image.

* * * * *